Figure 1:
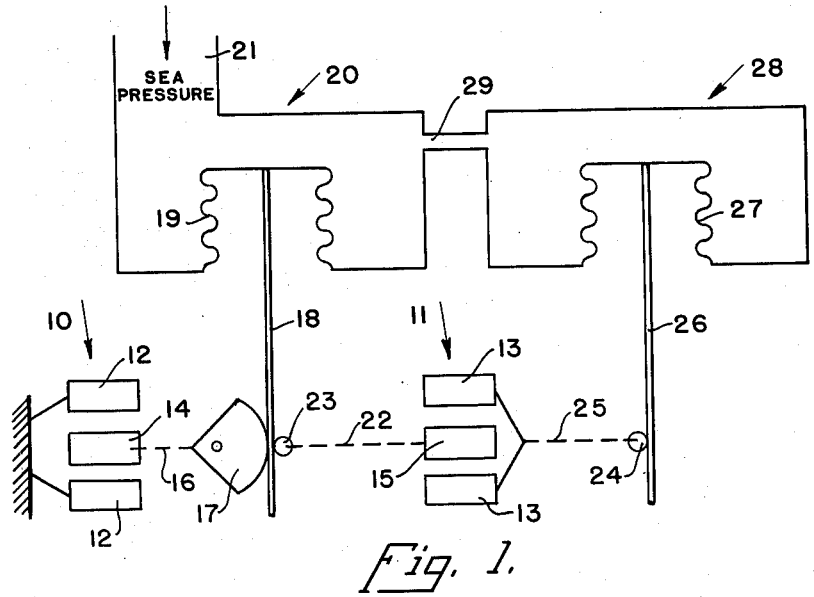

May 8, 1962 — L. S. JONES ETAL — 3,033,147
TORPEDO DEPTH CONTROL SYSTEM
Filed Oct. 7, 1953

INVENTORS
LEONARD S. JONES
STEPHEN KOWALYSHYN
EDWARD L. STONE
BY
ATTORNEYS

United States Patent Office 3,033,147
Patented May 8, 1962

3,033,147
TORPEDO DEPTH CONTROL SYSTEM
Leonard S. Jones and Stephen Kowalyshyn, Sharon, Pa., and Edward L. Stene, Kingston, R.I., assignors, by mesne assignments, to the United States of America as represented by the Secretary of the Navy
Filed Oct. 7, 1953, Ser. No. 384,806
6 Claims. (Cl. 114—25)

The present invention relates to torpedo depth control systems and has more particular reference to such systems having anticipating depth control characteristics.

Owing to the relatively high speed of present day torpedos, it has been necessary to incorporate into the depth control systems thereof means for anticipating the direction and degree of movement of the torpedo depth control surfaces that will be necessary to gradually bring the torpedo to a level track at a predetermined depth from an ascending or descending track whereby to prevent overshooting of, and reduce to a minimum oscillation or hunting about, the predetermined depth.

In one form of the anticipating depth control system, the instantaneous torpedo depth and the rate of change of torpedo depth are, by suitable means, converted into electrical signals which are subsequently applied to a common network for deriving an output voltage which serves to actuate the torpedo control surfaces in the proper amount and direction to bring the torpedo to, and achieve stable control at, the predetermined depth with the least amount of oscillation about that depth. To obtain the most efficient operation of such a system, it is necessary that the ratio of the amplitude of the voltage which is a function of the rate of change of depth of the torpedo to the amplitude of the voltage which is a function of the depth of the torpedo have as large a value as is possible.

Heretofore, various mechanical systems have been devised for providing a desired rate-depth voltage ratio, but the largest value of the ratio obtainable with such mechanical systems is limited by the size of the system components which can be practically employed without drastically increasing the overall size of the depth control device.

The present invention provides a compact arrangement for converting instantaneous torpedo depth and rate of change of torpedo depth into electrical signals, including ratio-controlling means other than purely mechanical means, whereby to provide an increased value of the ratio of the amplitude of the voltage which is a function of the rate of change of depth of the torpedo to the amplitude of the voltage which is a function of the depth of the torpedo over that obtainable by prior mechanical systems.

Accordingly, it is an object of the present invention to provide improved means, for use in a torpedo depth control system having anticipating control characteristics, for converting the instantaneous depth of the torpedo and the rate of change of depth of the torpedo into depth-control electrical signals.

Another object of the present invention is to provide means, including electrical means, for increasing the ratio of the amplitude of the voltage which is a function of the rate of change of depth of the torpedo to the amplitude of the voltage which is a function of the depth of the torpedo, in an electrical torpedo depth control system having anticipating control characteristics.

Another object is to provide improved means for converting torpedo depth and rate of change of torpedo depth into depth-control electrical signals, including a pair of synchro control transformers and electrical means for amplifying the output voltage of one of said transformers.

Figure 2:
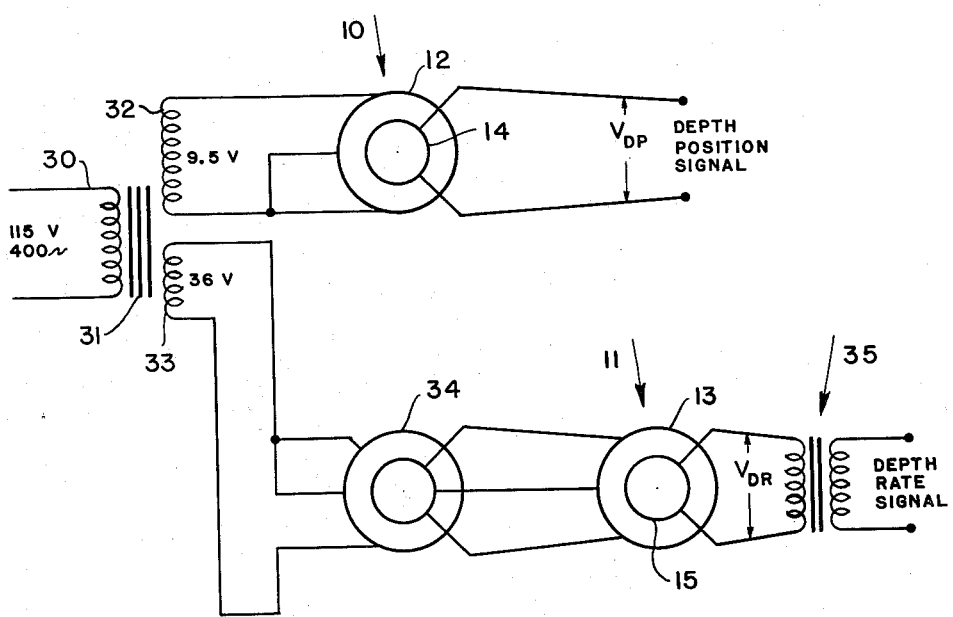

Other objects and many of the attendant advantages of the present invention will become apparent as the same becomes better understood from the following detailed description had in conjunction with the accompanying drawings wherein:

FIG. 1 is a diagrammatic view of the mechanical arrangement of hydrostats and synchros employed in the present invention; and FIG. 2 is a schematic of the depth-control electrical circuit comprising the present invention.

Referring now to the drawings and especially to FIG. 1 there is illustrated a pair of synchro control transformers 10 and 11 having stators 12 and 13 and rotors 14 and 15, respectively. Synchro control transformers 10 and 11 function in the well known manner to produce a single phase voltage whose magnitude is proportional to the sine of the angle of rotation of its rotor with respect to the magnetic field of its stator and serve to provide, respectively, a voltage whose magnitude is proportional to the instantaneous depth of the torpedo and a voltage whose magnitude is proportional to the rate of change of depth of the torpedo. Synchro transformer 10 has its stator 12 rigidly secured to a support member fixed within the torpedo body and has its rotor connected, as by means of a drive shaft 16, to a gear sector 17. Gear sector 17 has its teeth in meshing engagement with the teeth formed in a rack 18, which is adapted for axial movement and has one end secured to the bellows arrangement 19 extending into a chamber in a first hydrostat 20, which chamber is connected by means of a passage 21 to sea pressure. Synchro transformer 11 has its rotor 15 operably connected, as by a drive shaft 22, to a gear 23 which has driving engagement with rack bar 18 whereby axial movement of bar 18 will also cause rotation of rotor 15. Stator 13 of synchro transformer 11 is drivingly connected to a gear 24, as by a drive shaft 25, gear 24 being in driving engagement with a rack 26. Rack 26 is adapted to move axially in the torpedo housing and is secured at one end to a bellows arrangement 27 extending into a chamber in a second hydrostat 28, which chamber is connected by means of orifice 29 to the chamber in hydrostat 20.

From the description thus far it will be apparent that sea pressure acting on bellows arrangement 19 will cause movement of rack bar 18 thereby rotating rotor 14 of synchro transformer 10 through an angle which is a function of the sea pressure acting on bellows arrangement 19. Rotor 14 will, therefore, yield an output voltage which is a function of the sea pressure acting on bellows arrangement 19. Orifice 29 serves to restrict the flow of sea water from hydrostat 20 to hydrostat 28 whereby the differential pressure in hydrostats 20 and 28 will be a function of the rate of change of pressure and thus a function of the rate of change of torpedo depth. The differential movement of racks 18 and 26 will, therefore, also be a function of the rate of change of pressure or depth. Since synchro transformer 11 has its rotor 15 rotated by movement of rack 18 and its stator rotated by movement of rack 26, the output voltage of rotor 15 will be dependent upon the relative angle of rotation between the rotor 15 and stator 13 and thus will be a function of the differential pressure in hydrostats 20 and 28 and therefore a function of the rate of change of torpedo depth. As was previously stated, for proper operation of the depth control system in which the above described arrangement is used, the ratio of the depth rate voltage, derived from synchro transformer 11, to depth position voltage, derived from synchro transformer 10, should have as high a value as possible. In such a purely mechanical arrangement, however, the largest value of this ratio would be principally dependent upon the relative sizes of gear segment 17 and gears 23 and 24, and since the largest and smallest practical sizes of these gears are limited, the value of the depth-rate to depth-position voltage ratio would be considerably lower than desirable. The present invention provides synchro excitation and circuit means, now to be described, for increasing the value of this ratio.

Referring to FIG. 2, wherein there is schematically illustrated the electrical circuit including synchro transformers 10 and 11, a voltage source 30 which, through a transformer 31 having separate secondary windings 32 and 33, energizes the stators 12 and 13 of the synchro transformers 10 and 11, respectively, stator 13 being energized through an intermediate synchro 34. Synchro 34 serves as convenient means for the zeroing of the depth rate synchro 11, but if other mechanical provisions are made for zeroing of synchro 11, the intermediate synchro 34 may be omitted. The voltages indicated as $V_{dp}$ and $V_{dr}$ are the synchro control transformer output voltages whose magnitudes are proportional to the depth of the torpedo and to the rate of change in depth of the torpedo, respectively, which voltages are subsequently summed and applied to a servo system, not shown, for operating the torpedo depth rudders according to a function of these combined voltages. The value of the ratio $V_{dr}$ to $V_{dp}$ is dependent not only upon the described gearing but is further determined by the relative magnitudes of the separate excitation voltages applied to the depth and depth-rate synchro channels as shown. Step-up transformer 35, or any suitable voltage amplifying network, serves to amplify the depth rate voltage as obtained from the rotor of synchro transformer 11 and thus increase the $V_{dr}$–$V_{dp}$ ratio.

It will be apparent from the above description that the instant invention provides improved means for producing voltages whose magnitudes are functions of torpedo depth and rate of change of torpedo depth, respectively, for use in a depth control system wherein a relatively high depth-rate to depth-position voltage ratio is necessary for the proper operation of the system.

Obviously many modifications are possible in the light of the above teachings. It is therefore to be understood that within the scope of the appended claims the present invention may be practiced otherwise than as specifically described.

What is claimed is:

1. In a torpedo depth control system, a first hydrostat open to sea pressure, a second hydrostat connected to said first hydrostat by a reduced orifice whereby the pressure in said first hydrostat will be a function of torpedo depth and the differential pressure between said hydrostats will be a function of the rate of change of depth, a first synchro control transformer having its rotor operably connected to the pressure responsive element in the first hydrostat for rotation with movement of said element, a second synchro control transformer having its rotor operably connected to said element and its stator operably connected to the pressure responsive element of the second hydrostat whereby the relative rotation of the rotor and stator of said second control transformer will be a function of the rate of change of depth, and amplifying means for amplifying the voltage output of the last mentioned rotor.

2. In a torpedo depth control system, means including first and second electrical devices, each comprising a rotor element and a stator element, for producing a pair of output voltages which are functions of the relative angular disposition of the elements of the respective devices, means for separately exciting said devices at preselected voltage levels, mechanism for angularly positioning one of the elements of each said device as a function of torpedo depth, and mechanism for angularly positioning the other element of said second device in a manner to cause the relative angular disposition of the elements of said second device to be a function of rate of change in torpedo depth.

3. In a torpedo depth control system, means including first and second electrical synchro devices, each including a rotor and a stator, for producing a pair of output voltages which are functions of the relative angular disposition of the rotor and stator of the respective devices, means for separately exciting said devices at preselected voltage levels, pressure sensitive mechanism for angularly positioning the rotors of both devices as a function of torpedo depth, and pressure sensitive mechanism for angularly positioning the stator of said second device in a manner to cause the relative angular disposition of the rotor and stator of said second device to be a function of rate of change in torpedo depth.

4. In a torpedo depth control system, first and second movable elements, means for positioning said elements as a function of torpedo depth, means for delaying positioning said second element such that its position relative to said first element will be a function of rate of change of torpedo depth, first and second separately excited electrical synchros having their rotors operatively connected to be angularly positioned by movement of said first element, and the stator of said second synchro being operatively connected to be angularly positioned by said second element, said first synchro thereby delivering an output voltage corresponding to torpedo depth and said second synchro thereby delivering an output voltage corresponding to rate of change of torpedo depth.

5. The arrangement according to claim 4 wherein said means comprises pressure sensitive means.

6. In a torpedo depth control system, a pair of separately excited first and second electrical synchros, means for simultaneously positioning the rotors of both synchros as a function of torpedo depth, and means for positioning the stator of said second synchro relative to the rotor of said second synchro as a function of rate of change of torpedo depth, said first synchro thereby delivering an output voltage corresponding to torpedo depth and said second synchro thereby delivering an output voltage corresponding to rate of change of torpedo depth.

References Cited in the file of this patent

UNITED STATES PATENTS

| | | |
|---|---|---|
| 1,223,747 | Van Stockum | Apr. 24, 1917 |
| 1,997,412 | Fischel | Apr. 9, 1935 |
| 2,104,627 | Manteuffel | Jan. 4, 1938 |
| 2,488,286 | Glenny | Nov. 15, 1949 |
| 2,589,834 | MacCallum | Mar. 18, 1952 |
| 2,693,921 | McKissack et al. | Nov. 9, 1954 |